United States Patent [19]
McDonald

[11] Patent Number: 5,919,268
[45] Date of Patent: Jul. 6, 1999

[54] SYSTEM FOR DETERMINING THE AVERAGE LATENCY OF PENDING PIPELINED OR SPLIT TRANSACTION REQUESTS THROUGH USING TWO COUNTERS AND LOGIC DIVIDER

[75] Inventor: Edward A. McDonald, Baton Rouge, La.

[73] Assignee: NCR Corporation, Dayton, Ohio

[21] Appl. No.: 08/925,982

[22] Filed: Sep. 9, 1997

[51] Int. Cl.$^6$ .................................................. G06F 11/00
[52] U.S. Cl. ............................... 714/47; 714/37; 714/39; 714/47; 714/48
[58] Field of Search .................................... 395/182, 183, 395/184, 185, 200.53, 287–311, 878, 879, 880, 881, 835, 836, 837, 838, 839, 750, 800.2, 305, 376, 733, 557

[56] References Cited

U.S. PATENT DOCUMENTS

| | | | |
|---|---|---|---|
| 5,426,741 | 6/1995 | Butts | 395/325 |
| 5,533,037 | 7/1996 | Shah et al. | 371/62 |
| 5,548,728 | 8/1996 | Danknick | 395/200.14 |
| 5,555,383 | 9/1996 | Elazar et al. | 395/306 |
| 5,557,548 | 9/1996 | Gover | 364/551.01 |
| 5,568,445 | 10/1996 | Park et al. | 365/233 |
| 5,657,253 | 8/1997 | Dreyer | 364/555.01 |
| 5,751,945 | 5/1998 | Levine | 395/184.01 |
| 5,819,053 | 10/1998 | Goodrum | 395/306 |

OTHER PUBLICATIONS

Sarangdhar, "An overview of the Pentium Pro processor bus", Compcon '96 Technologies for the Information Superhighway Digest of papers, pp. 383–387, Feb. 1996.

Papworth, D.B., "Tuning the Pentium Pro microarchitecture", IEEE Micro, pp. 8–15, Apr. 1996.

*Primary Examiner*—Meng-Ai T. An
*Assistant Examiner*—Stacy Whitmore
*Attorney, Agent, or Firm*—James M. Stover

[57] ABSTRACT

Logic for determining the average latency of pending pipelined and split bus transactions within a computer system including a bus, such as an Intel Pentium Pro or P6 bus, which supports pipelined and split bus transactions. The logic includes a first counter connected to the bus, and containing a TOTAL QUALIFIED CYCLES count value which is incremented on the start of every qualified bus cycle placed on the bus; logic for determining a cycle COUNT-BY-VALUE representing the number of outstanding or pending qualified bus cycles during any bus cycle; and a second counter which is incremented at the start of every qualified bus cycle occurring during the sample period by the number of outstanding qualified bus cycles to provide a TOTAL LATENCY CLOCKS count value. Divider logic is connected to receive the TOTAL QUALIFIED CYCLES count value from the first counter and the TOTAL LATENCY CLOCKS value from the second counter and divide the TOTAL QUALIFIED CYCLES count value into the TOTAL LATENCY CLOCK value to determine the average number of clocks of latency, or average number of pending bus cycles, per qualified bus cycle.

7 Claims, 5 Drawing Sheets

SYSTEM FOR DETERMINING THE AVERAGE LATENCY OF PENDING PIPELINED OR SPLIT TRANSACTION REQUESTS THROUGH USING TWO COUNTERS AND LOGIC DIVIDER

The present invention relates to computer systems employing bus structures supporting pipelining or split transactions and, more particularly, to a method for monitoring and improving the performance of such systems.

BACKGROUND OF THE INVENTION

FIG. 1 provides a simple block diagram of a standard high volume (SHV) symmetric multiprocessing (SMP) computer system employing currently available commodity components. The design shown employs Intel Pentium Pro™ processors and a high-performance bus and chipset, such as an Intel P6 bus and 82450GX chipset, respectively, that are intended to be the SHV companions of the Pentium Pro processor.

The system as shown in FIG. 1 includes a high-bandwidth split-transaction bus 103. The P6 system bus 103 provides support for up to four processors 101 and two PCI interfaces 109 and is designed to connect efficiently to a long-latency memory subsystem, consisting of a system memory 105 and a memory controller chipset 107. Connection to standard PCI devices, not shown, is provided through PCI I/O interfaces 109. As stated above, all of these components are currently available commodity components.

The P6 bus is demultiplexed, fully pipelined, supports split transactions, and can sustain a peak bandwidth of 528 Mbytes/s. Cache consistency is maintained in a multiprocessor environment, with data "snooping" to improve performance. The P6 bus consists of several groups of signals, including arbitration, address, data, and response signals. Each group conducts its business independently and in parallel with the others, allowing bus transactions to be overlapped. Transactions can be fully pipelined, much like instruction execution in a pipelined processor.

FIG. 4 illustrates the pipelining process. The pipelining process depicted in FIG. 4 and discussed below has been greatly simplified to facilitate an understanding of the pipelining process. The actual protocol utilized in current computer systems utilizing pipelined bus structures can be much more complex than illustrated in FIG. 4.

A first group of signals handles arbitration. In the figure, arbitration for the first transaction ("A") occurs in cycle one. During cycle two, all processors analyze the arbitration results and agree on which will be the master for the next transaction. At cycle three, the master asserts a target address on the request bus, followed by supplemental information in the next cycle. Also at this time, i.e., during cycle four, arbitration for the next transaction ("B") is already under way on the arbitration bus.

At cycle six, the target device can signal an address parity error. In the meantime, other bus devices have been checking to see if the target address hits in their caches; at cycle seven, these devices use the snoop signals to indicate a hit, in which case data may be returned by the snooping device rather than by the original target. If there are no snoop hits, the target device uses the response bus during cycle nine to indicate whether this transaction has completed successfully; if so, data is transmitted on the data bus starting in that same cycle.

Note that, by this time, the arbitration bus can be processing a fourth transaction. At full speed, a 32-byte read takes twelve cycles to complete but uses the data bus for only four of those cycles. With the other buses forging ahead, the data bus can be fully utilized for long periods of time; in this way, three or four transactions can be in progress at once.

The P6 approach improves utilization by pipelining the transactions instead of splitting them. A P6 bus supports up to eight transactions at once, which can occur if devices throttle the bus to extend the transaction latency. The P6 approach eliminates the need for memory controllers to be bus masters, simplifying their design, while allowing high bus utilization. Split transactions are also supported by the P6 bus so that a slow device does not hold up the entire bus. A split transaction allows other transactions to occur during an arbitrarily long latency period. If a device will take significantly more than six cycles to respond, it can defer its response, e.g., at cycle nine in FIG. 4. In this case, the device must eventually rearbitrate for the bus before finally returning the requested data to the original requester. Data phase transfers shown occuring during cycles nine through twelve would also not occur.

Once a transaction is deferred, it does not count against the limit of eight pending bus transactions. Each P6 processor, however, has a limit of four outstanding transactions, including deferred requests from that processor.

As stated above, the Pentium Pro bus allows up to eight transactions to be pending in a heavily pipelined but tenured mode, and many more transactions to be outstanding in a split-transaction mode. Identification and monitoring of the latency of pipelined and outstanding transactions provides information useful for improving system performance.

The method and apparatus described herein is specifically implemented for performance monitoring the latency of pipelined and split transaction cycles on Intel's Pentium Pro (P6) bus, but is applicable to any bus or split transaction protocol. Determining accurate latency information with so many pending transactions, particularly if it is desired to monitor latency characteristics by qualifying the bus cycle, would require much hardware without a method and apparatus similar to the system described below.

OBJECTS OF THE INVENTION

It is therefore an object of the present invention to provide a new and useful method and apparatus for monitoring the latency of transactions within computer system bus structures supporting pipelining or split transactions.

It is another object of the present invention to provide a new and useful method and apparatus for determining the average number of pending bus cycles per qualified bus cycle within a computer system employing a bus structure supporting pipelining or split transactions.

SUMMARY OF THE INVENTION

There is provided, in accordance with the present invention, a logic for determining the average latency of pending pipelined and split bus transactions within a computer system including a bus, such as an Intel Pentium Pro or P6 bus, which supports pipelined and split bus transactions. The logic includes a first counter connected to the bus, and containing a TOTAL QUALIFIED CYCLES count value which is incremented on the start of every qualified bus cycle placed on the bus; logic for determining a cycle COUNT-BY-VALUE representing the number of outstanding or pending qualified bus cycles during any bus cycle; and a second counter which is incremented at the start of every qualified bus cycle occurring during the sample period by the number of outstanding qualified bus cycles to provide a TOTAL LATENCY CLOCKS count value. Divider logic is connected to receive the TOTAL QUALIFIED CYCLES count value from the first counter and the TOTAL LATENCY CLOCKS value from the second counter and divide the TOTAL QUALIFIED CYCLES count value into the TOTAL LATENCY CLOCK value to determine the average number of clocks of latency, or average number of pending bus cycles, per qualified bus cycle.

The above and other objects, features, and advantages of the present invention will become apparent from the following description and the attached drawings.

DETAILED DESCRIPTION OF THE PREFERRED EMBODIMENT

NCR Corporation has developed an advanced SMP architecture which utilizes system techniques pioneered by NCR while also advantageously making use of standard high volume (SHV) components, such as Intel Pentium Pro processors, PCI I/O chipsets, Pentium Pro chipsets, Pentium Pro bus topology (P6), and standard memory modules (SIMMs and DIMMs) to provide world class scalability and feature content not available in prior SMP Pentium Pro systems. Two implementations of this advanced SMP architecture are illustrated in FIGS. 2 and 3.

Figure 1:
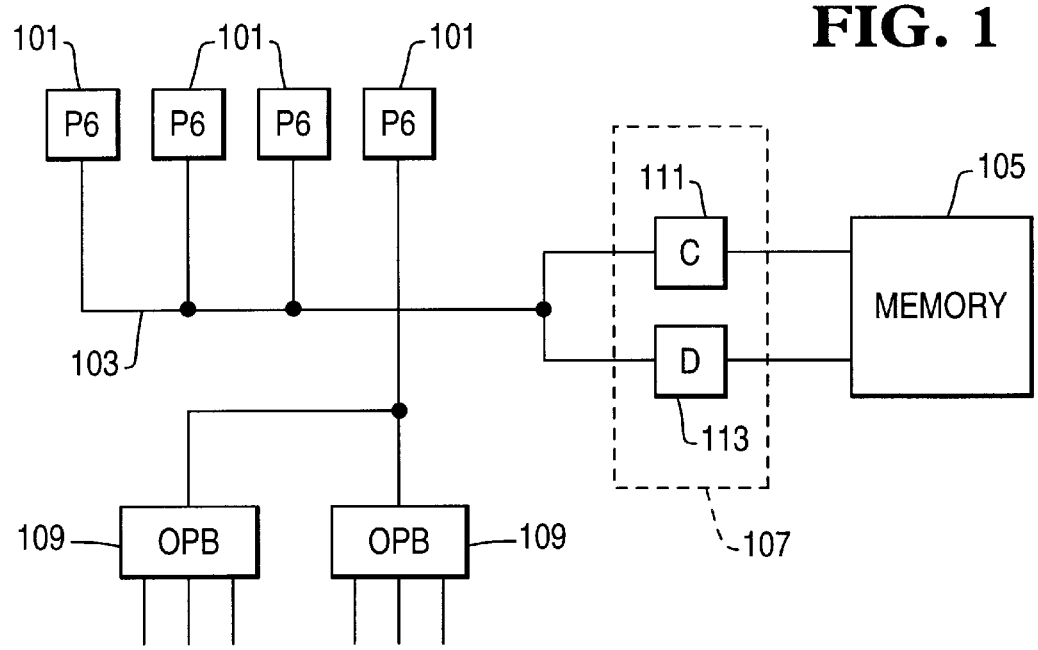
FIG. 1 is a simple block diagram representation of a four processor super high volume (SHV) symmetric multiprocessing (SMP) computer system employing currently available commodity components.
Figure 2:
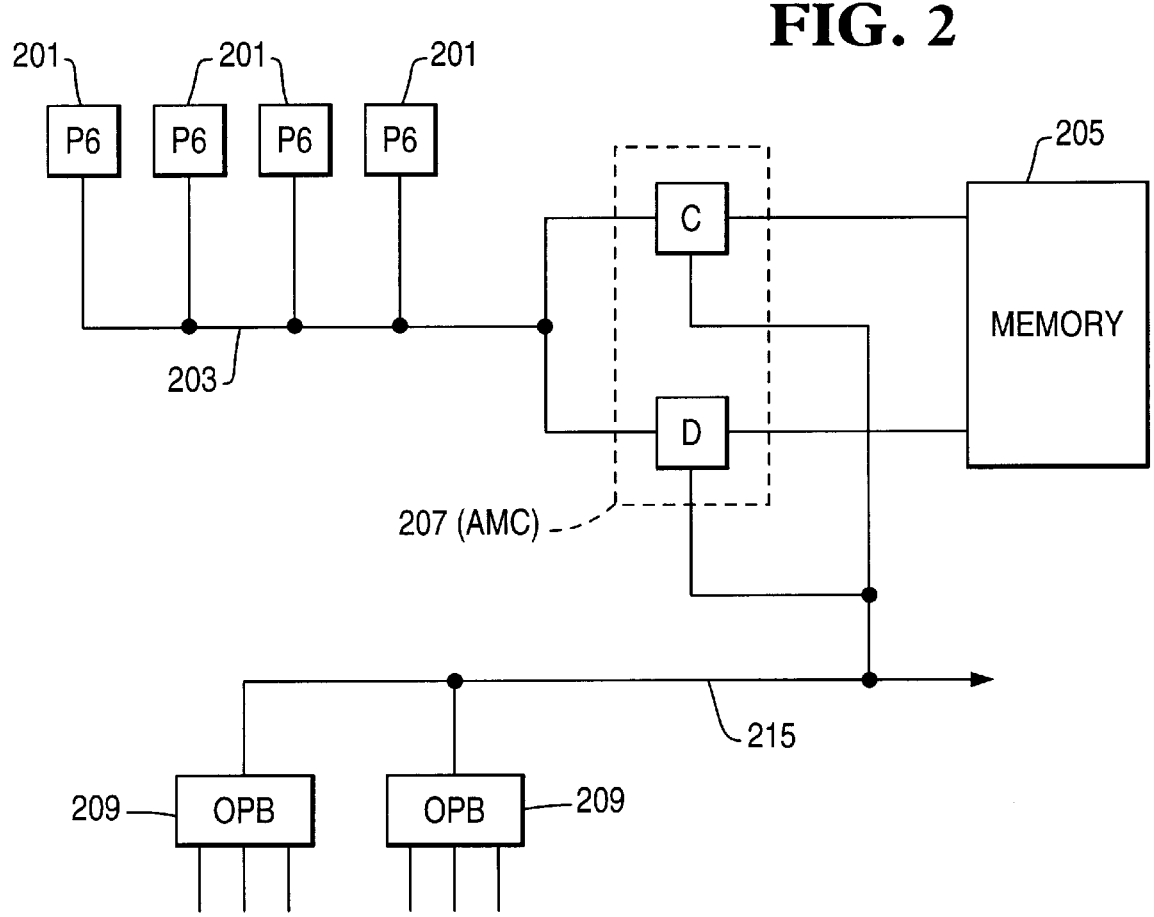
FIG. 2 is a simple block diagram representation of a super high volume (SHV) symmetric multiprocessing (SMP) computer system employing a dual ported advanced memory controller.
Figure 3:
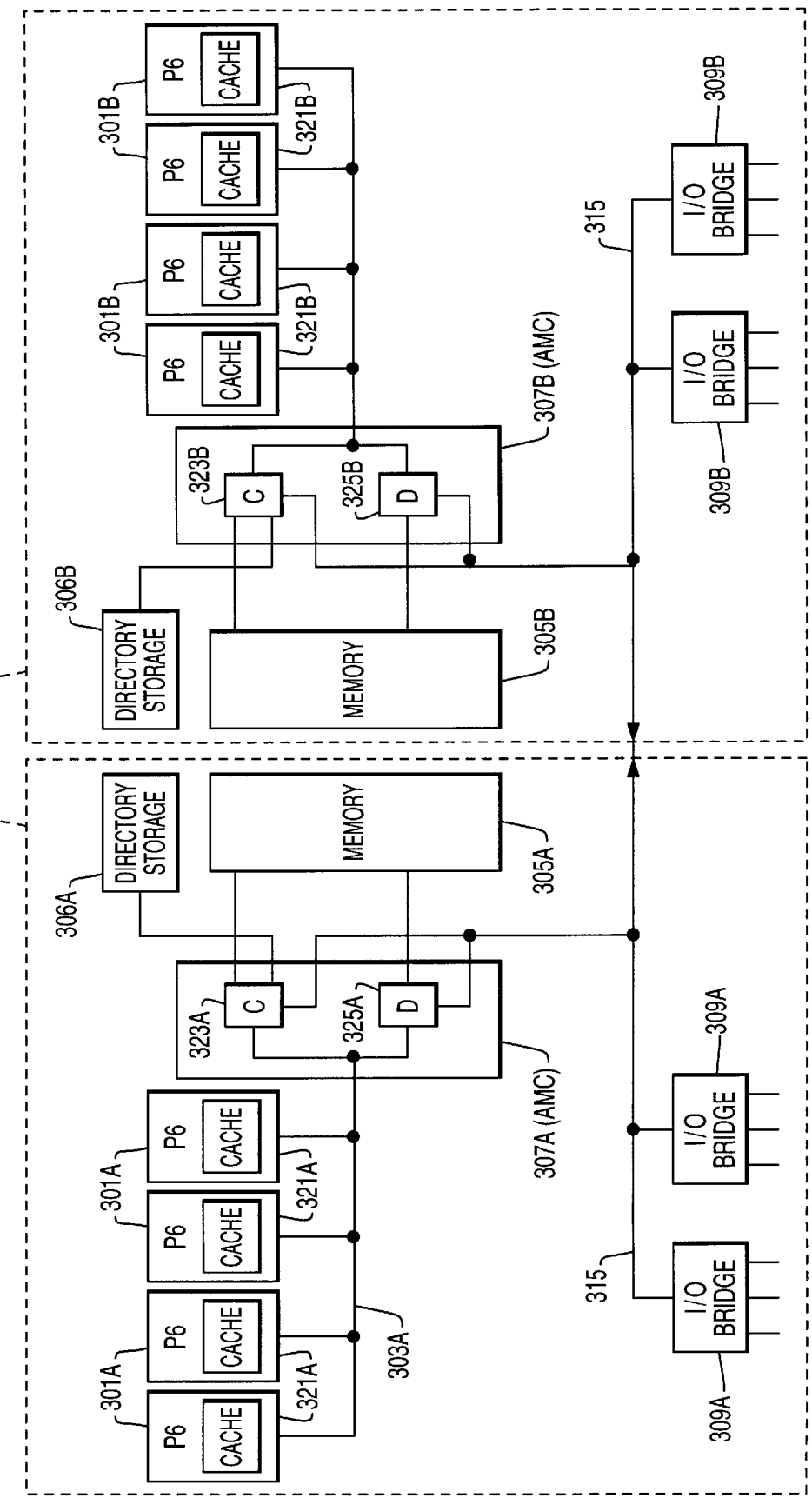
FIG. 3 is a simple block diagram representation of an eight processor super high volume (SHV) symmetric multiprocessing (SMP) computer.
Figure 4:
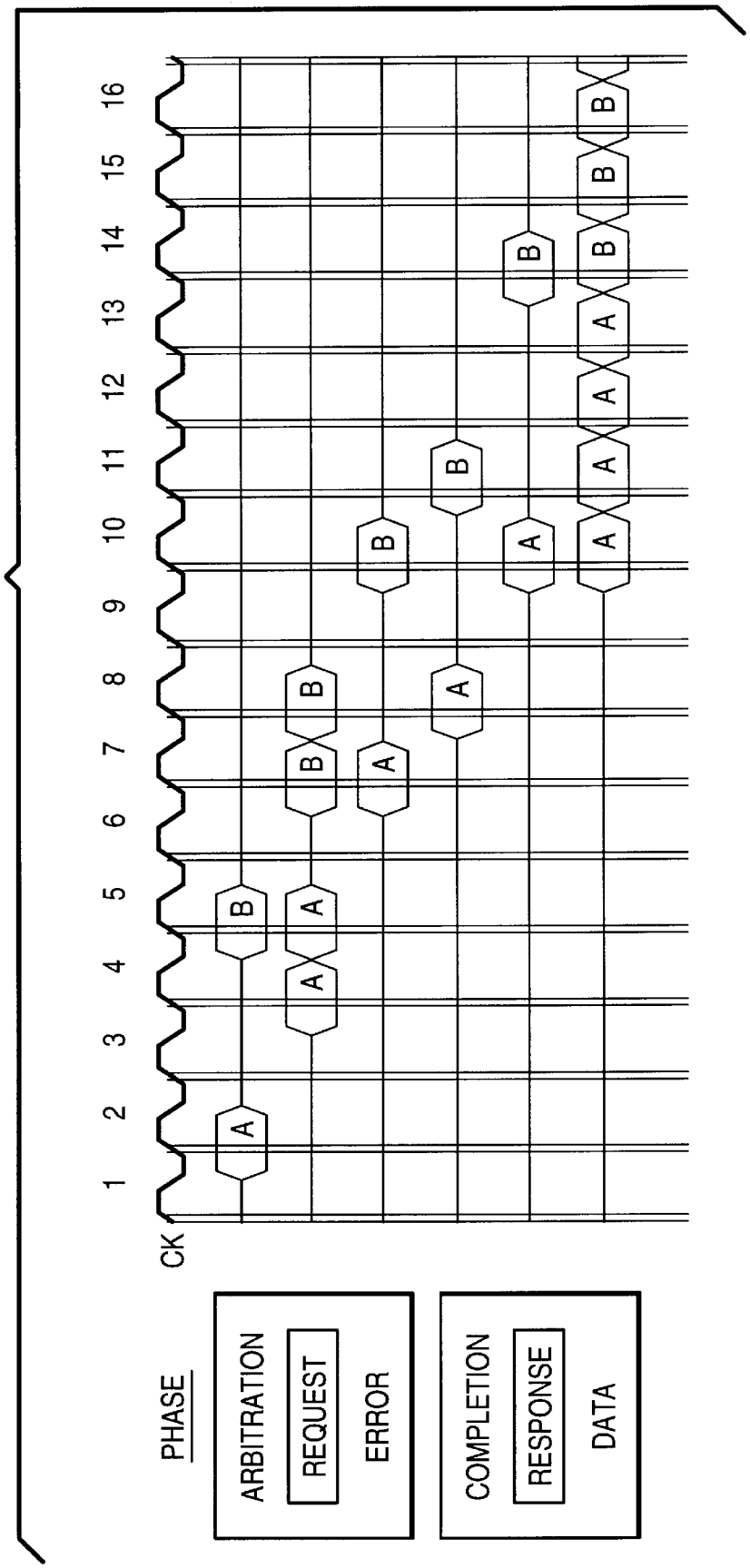
FIG. 4 is a timing diagram illustrating the manner in which transactions are pipelined on the processor bus in FIGS. 1 through 3.

FIG. 2 provides a simple block diagram representation of a SHV symmetric multiprocessing computer system employing a dual-ported advanced memory controller developed by NCR and providing support for up to four processors. Note the similarities shown in the system of FIG. 2 and the commodity Pentium Pro processor/P6 bus SHV system shown in FIG. 1.

The system as shown in FIG. 2 includes up to four processors 201 connected to a high-bandwidth split-transaction P6 processor bus 203. A system memory 205 is connected to bus 203 through an advanced dual-ported memory controller 207. The P6 processor bus 203 is connected to the first port of memory controller 207. The second memory controller port connects to a second P6 I/O bus 215, also referred to herein as an expansion bus, which provides connection for multiple PCI I/O interfaces 209. All of these components, with the exception of advance memory controller 207, are currently available commodity components.

The advanced memory controller (AMC) 207 manages control and data flow in all directions between the P6 processor bus and P6 I/O bus. The I/O bus may contain P6 to PCI I/O Bridges and another AMC ASIC for connectivity to another processor bus, as will be discussed below. The AMC 207 also controls access to a coherent DRAM memory array. The AMC as presently implemented consists of a control and data slice ASIC pair.

The four processors use a bus snooping protocol on the P6 processor bus 203. Bus snooping is a method of keeping track of data movements between processors and memory. There are performance advantages to this system with a small number of tightly-coupled processors. If a processor needs data that is available in the data cache of another processor on the same bus, the data can be shared by both processors. Otherwise, the data must be retrieved from main memory 205, a more time consuming operation which requires system bus traffic. This method enhances system performance by reducing system bus contention.

The characteristics of the NCR architecture shown in FIG. 2 include:

Capitalizes on industry SHV architecture and supporting commodity chips (IOB. etc.)

Dual ported memory controller 207 permits connection and utilization of dual buses, each operating at 66 HHz with a bandwidth of 64 bits and capable of sustained data transfer rates of 528 MB/s.

Dual bus approach provides greater scalability through a reduction of bus loading and provision of a private processor to memory path that can operate independent of IOB to IOB traffic.

Additional processors and I/O devices can be connected to the expansion bus 215.

The system as described is able to fill High Availability Transaction Processing (HATP) and Scaleable Data Warehouse (SDW) server needs, while capitalizing on the industry SHV motion.

The advanced SMP architecture shown in FIG. 2, as well as the SHV architecture shown in FIG. 1, can employ up to four processors. However, the NCR architecture and advanced memory controller shown in FIG. 2 are designed to allow two complexes, each similar to that shown in FIG. 2, to be interconnected to form an eight-processor system.

FIG. 3 illustrates an eight-processor SMP system formed of two four-processor building blocks. Each block, identified by reference numerals A and B, is seen to include all of the structure shown in FIG. 2. System components are identified by reference numerals ending in an A or a B, for complex "A" and "B", respectively. However the two systems are interconnected thorough a common expansion bus 315.

A more detailed discussion of the NCR Advanced Memory Controller and system architectures employing the NCR Advanced Memory Controller is provided in U.S. patent application Ser. No. 08/760,126, filed Dec. 3, 1996, titled "COMPUTER SYSTEM INCLUDING MULTIPLE SNOOPED, MULTIPLE MASTERED SYSTEM BUSSES AND METHOD FOR INTERCONNECTING SAID BUSSES," by Gene F. Young. U.S. patent application Ser. No. 08/760,126, assigned to NCR Corporation, is incorporated herein by reference.

Figure 5A:
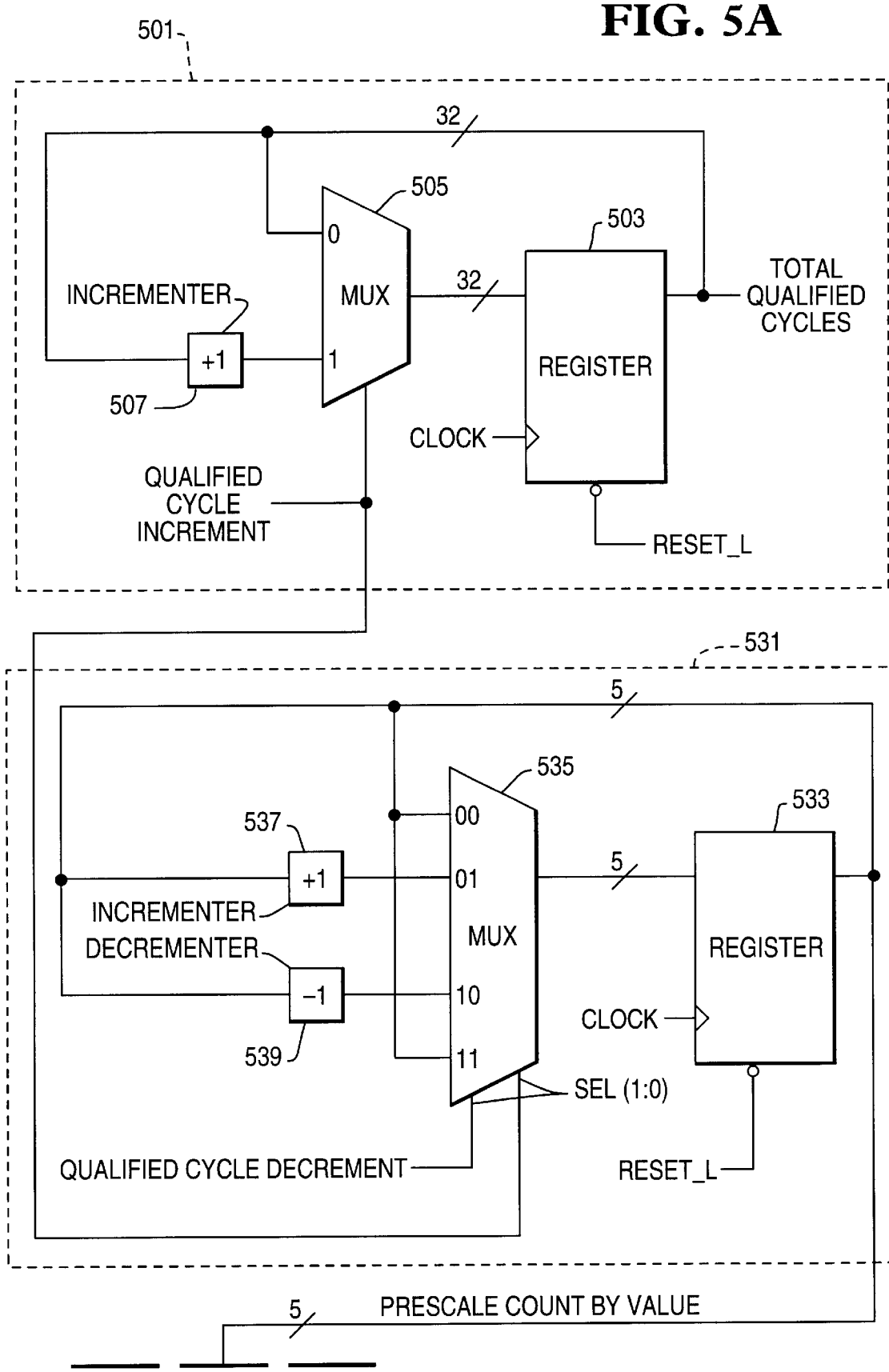
FIGS. 5A and 5B provide a block diagram illustration of logic included within the advanced memory controller shown in FIGS. 2 and 3 for monitoring the average latency of pipelined or split transactions requiring use of the processor bus.
Figure 5B:
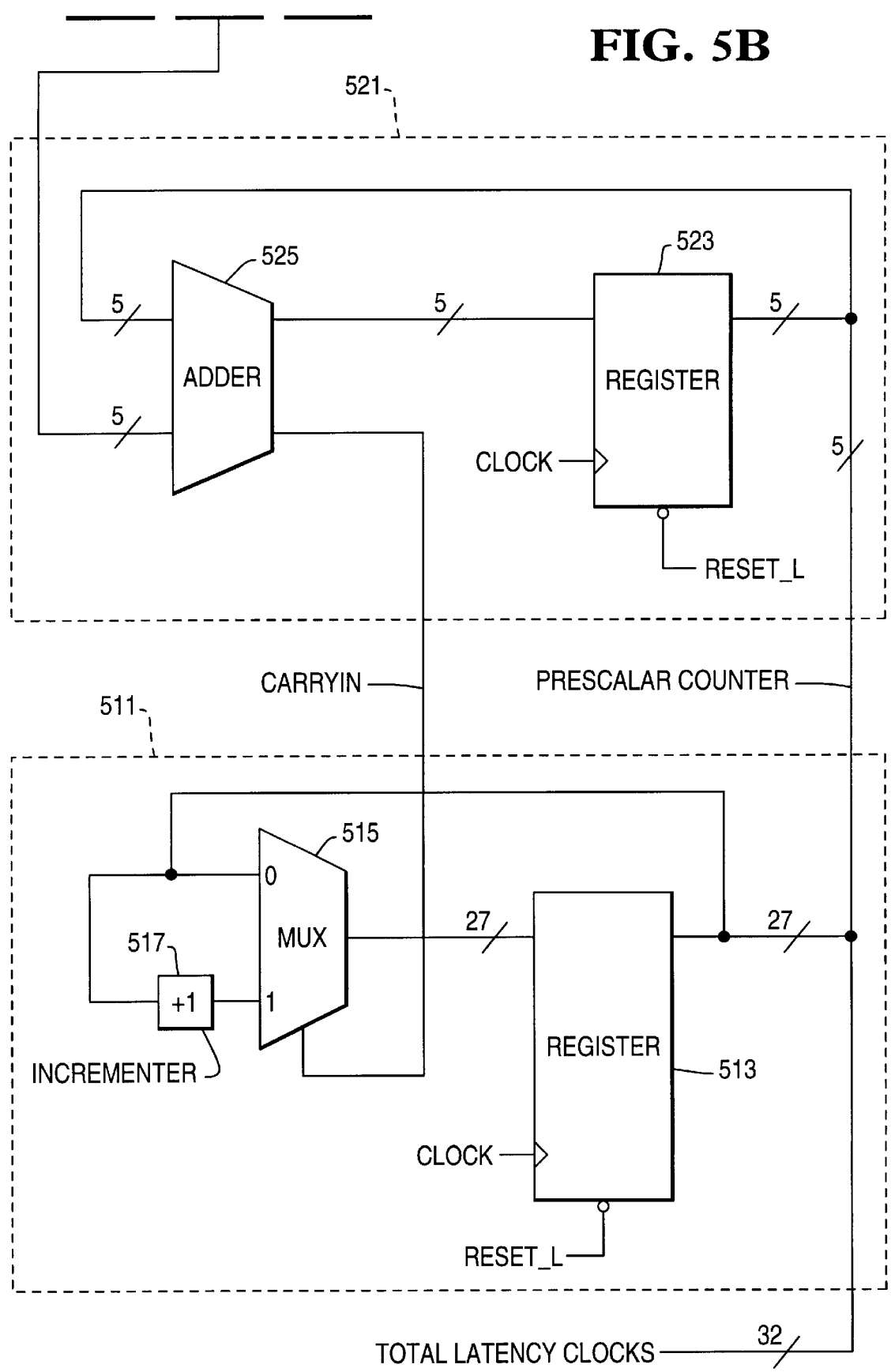

Included within the advanced memory controller shown in FIGS. 2 and 3 is logic for monitoring the average latency of pipelined or split transaction cycles which require use of the processor bus. This logic, shown in FIGS. 5A and 5B includes two counters to measure latency of qualified bus cycle types. The first counter 501 is incremented on the start of every qualified bus cycle or qualified clock signal occurring during a sample period. The qualifying of which cycle types to monitor typically occurs a fixed number of clocks after the start of a cycle being issued on the bus (e.g. address decode, etc.). In FIG. 5A, counter 501 is seen to include a thirty-two bit register 503, a two-to-one multiplexer 505, and an incrementer 507. The output of register 503 is provided to the 0 input of multiplexer 505, and through incrementer 507 to the 1 input of multiplexer 505. The output of multiplexer 505 is connected to the input of register 503. A QUALIFIED CYCLE INCREMENT signal is provided to the select input of multiplexer 505 to determine which multiplexer input is provided to register 503. The output of register 503 is also the output of first counter 501, a thirty-two bit value identified as TOTAL QUALIFIED CYCLES. The TOTAL QUALIFIED CYCLES value represents the number of clock cycles counted during receipt of a positive state QUALIFIED CYCLE INCREMENT signal.

The second counter is incremented on every clock cycle occurring during the sample period by the number of outstanding qualified bus cycles, providing a thirty-two bit output identified as TOTAL LATENCY CLOCKS. In the implementation shown in FIG. 5B, the second counter actually includes two counter sections: a normal count-by-one counter 511 which generates the upper twenty-seven bits of the TOTAL LATENCY CLOCKS value, and a "prescaler" counter 521 providing the lower five bits of the TOTAL LATENCY CLOCKS value.

Prescaler counter 521 includes a five bit register 523 and a five bit adder 525. The output of register 523 is provided to one of two inputs of adder 525; the other input being connected to receive a PRESCALER COUNT-BY-VALUE, discussed below. Adder 525 provides a five bit sum to register 523 and a carry or overflow signal, CARRYIN, to count-by-one counter 511. The contents of prescaler counter 521 is increased on every clock cycle by the number of outstanding qualified bus cycles. For example, if there are thirteen pending qualified bus cycles that have not completed, the prescaler counter increments by thirteen on every clock cycle. The prescaler counter is large enough to support counting by the maximum number of pending qualified bus transactions.

Logic for determining the PRESCALER COUNT-BY-VALUE includes a five bit register 533, a four-to-one multiplexer 535, an incrementer 537 connected to receive and add one to the output of register 533, and a decrementer 539 connected to receive and subtract one from the output of register 533. The four inputs of multiplexer 535, identified as 00, 01, 10 and 11 inputs, are respectively connected to the outputs of register 533, incrementer 537, decrementer 539, and register 533. The multiplexer input which is routed to register 535 is selected by a QUALIFIED CYCLE DECREMENT signal and the QUALIFIED CYCLE INCREMENT signal provided to two multiplexer select inputs, SEL 1 and SEL 0, respectively. The QUALIFIED CYCLE DECREMENT and QUALIFIED CYCLE INCREMENT signals are generated by logic within the AMC.

Prescaler counter 521 is designed to increment by the PRESCALER COUNT-BY-VALUE provided by register 533 on every clock cycle during the sample period. Qualified bus cycles are tagged in the AMC chipset so that when qualified bus cycles are completed the PRESCALER COUNT-BY-VALUE can be decremented. The PRESCALER COUNT-BY-VALUE counter 531 handles simultaneous increments and decrements appropriately.

Counter section 511 includes a twenty-seven bit register 513, a two-to-one multiplexer 515, and an incrementer 517. The output of register 513 is provided to the 0 input of multiplexer 515, and through incrementer 517 to the 1 input of multiplexer 515. The output of multiplexer 515 is connected to the input of register 513. The CARRYIN signal from adder 525 is provided to the select input of multiplexer 515 to determine which multiplexer input is provided to register 513.

The output of second counter, the thirty-two bit value identified as TOTAL LATENCY CLOCKS, consists of the output of register 513 which forms the upper twenty-seven bits of the TOTAL LATENCY CLOCKS value, and the output of register 523 which forms the lower five bits of the TOTAL LATENCY CLOCKS value.

At the end of any selected sample period, the average latency of the qualified bus cycle can be determined by dividing the contents of first counter 501, i.e., the TOTAL QUALIFIED CYCLES value, into the contents of the second counter, i.e., the TOTAL LATENCY CLOCKS value, to yield the average number of clocks of latency per qualified bus cycle. The logic for dividing the TOTAL QUALIFIED CYCLES value into the TOTAL LATENCY CLOCKS value can be implemented in either hardware or in software. Although not shown, this divider logic can be readily constructed by those skilled in the art.

Note that the delay required to determine a qualified bus cycle, i.e., the address decode time, can be accounted for either directly in the hardware, such as by delaying the decrements by the same number of clocks, or simply adjusting the calculation to add in the appropriate number of clocks which would be the first counters value times the number of clocks required to do the "qualifying".

It can thus be seen that there has been provided by the present invention a new and useful method and apparatus for monitoring the latency of transactions within computer system bus structures supporting pipelining or split transactions. The logic described herein provides a hardware efficient method of monitoring the average latency of qualified bus cycles for pipelined and/or split transaction cycles. Other methods would likely require considerably more hardware to implement. The efficiency of the described design allows this logic to be built into any ASIC (Application Specific Integrated Circuit) at minimal cost, and allows performance monitoring of latency characteristics of any system.

Although the presently preferred embodiment of the invention has been described, it will be understood that various changes may be made within the scope of the appended claims.

What is claimed is:

1. In a computer system including a bus which supports pipelining of bus transactions, wherein multiple transactions can be pending while a current transaction utilizes the bus, apparatus for monitoring of the latency of pending transactions, the apparatus comprising:

a first counter connected to said bus, said first counter containing a TOTAL QUALIFIED CYCLES count value which is incremented on the start of every bus cycle placed on said bus during receipt of a qualified increment signal;

a second counter which is incremented on every clock cycle occurring during the sample period by the number of outstanding bus cycles to provide a TOTAL LATENCY CLOCKS count value; and divider logic connected to receive the TOTAL QUALIFIED CYCLES count value from said first counter and the TOTAL LATENCY CLOCKS value from said second counter to divide said TOTAL QUALIFIED CYCLES count value by said TOTAL LATENCY CLOCK value to determine the average number of clocks of latency per bus cycle during receipt of one of the selected signals input to the divider logic.

2. The apparatus according to claim 1, wherein said bus is an Intel Pentium Pro (P6) bus.

3. The apparatus according to claim 1, further comprising:
logic for determining a cycle COUNT-BY-VALUE, said COUNT-BY-VALUE being the number of outstanding bus cycles during any bus cycle.

4. Apparatus for determining the average latency of pending pipelined and split bus transactions within a computer system including a bus which supports pipelined and split bus transactions, the apparatus comprising:

a first counter connected to said bus, said first counter containing a TOTAL QUALIFIED CYCLES count value which is incremented on the start of every qualified bus cycle placed on said bus during receipt of a qualified increment signal;

logic for determining a cycle COUNT-BY-VALUE, said COUNT-BY-VALUE being the number of outstanding qualified bus cycles during any bus cycle;

a second counter which is incremented on every clock cycle occurring during the sample period by the number of outstanding qualified bus cycles to provide a TOTAL LATENCY CLOCKS count value; and divider logic connected to receive the TOTAL QUALIFIED CYCLES count value from said first counter and the TOTAL LATENCY CLOCKS value from said second counter to divide said TOTAL CYCLES count value by said TOTAL LATENCY CLOCK value to determine the average number of clocks of latency per qualified bus cycle during receipt of one of the selected signals input to the divider logic.

5. The apparatus according to claim 4, wherein:

said first counter includes a thirty-two bit register having an output which is provided to a first (0) input of a two-to-one multiplexer, and through an incrementer to a second (1) input of said multiplexer, said multiplexer having a select input for receiving a QUALIFIED CYCLE INCREMENT signal and an output which is connected to an input of said register, said register output being said TOTAL QUALIFIED CYCLES count value;

said logic for determining a cycle COUNT-BY-VALUE includes a five-bit register having an output which is provided to a first (00) and a fourth (11) input of a four-to-one multiplexer, through an incrementer to a second (01) input of said four-to-one multiplexer, and through a decrementer to a third (10) input to said four-to-one multiplexer, said four-to-one multiplexer having a first select (0) input for receiving said QUALIFIED CYCLE INCREMENT signal, a second select (1) input for receiving a QUALIFIED CYCLE DECREMENT signal and an output connected to an input of said five-bit register, said five-bit register output being said COUNT-BY-VALUE, and said second counter including a five-bit register having an output which is provided to a first input of an adder, said adder having a second input connected to receive said COUNT-BY-VALUE, an output connected to said last-recited five-bit register, and a CARRYIN output, the output of said last-recited five-bit register being the lower five bits of said TOTAL LATENCY CLOCKS count value, said second counter further including a twenty-seven bit register having an output which is provided to a first (0) input of a two-to-one multiplexer, and through an incrementer to a second (1) input of said last-recited multiplexer, said last-recited multiplexer having a select input for receiving said CARRYIN signal and an output which is connected to an input of said twenty-seven bit register, said register output being the upper twenty-seven bits of said TOTAL LATENCY CLOCKS count value.

6. In a computer system including a bus which supports deferred bus transactions, wherein multiple bus transactions can be pending while a current transaction utilizes the bus, a method for determining the average latency of pending bus transactions within said computer system, the method comprising the steps of:

incrementing by one a TOTAL QUALIFIED CYCLES count value contained within a first counter at the start of every bus cycle placed on said bus during receipt of a qualified cycle increment signal;

incrementing a TOTAL LATENCY CLOCKS count value contained within a second counter at the start of every bus cycle occurring during the sample period by the number of outstanding bus cycles; and dividing the TOTAL QUALIFIED CYCLES count value maintained within said first counter into the TOTAL LATENCY CLOCKS value maintained within said second counter to determine the average number of clocks of latency per bus cycle during receipt of one of the selected signals input to the divider logic.

7. The method according to claim 6, wherein said bus is an Intel Pentium Pro (P6) bus.

* * * * *